United States Patent [19]

Miles

[11] 4,307,892
[45] Dec. 29, 1981

[54] INTERCHANGEABLE RUNNERS AND WHEELS ASSEMBLAGE FOR HAND TRUCKS

[76] Inventor: Hugh G. Miles, 26 E. Maple St., Steamboat Springs, Colo. 80477

[21] Appl. No.: 97,180

[22] Filed: Nov. 26, 1979

[51] Int. Cl.³ .................................................. B62B 13/18
[52] U.S. Cl. .................................................... 280/9
[58] Field of Search ............... 280/9, 11, 8, 10, 7.12, 280/5.24, 47.27, 47.28, 47.29, 47.13 X

[56] References Cited

U.S. PATENT DOCUMENTS

| | | | |
|---|---|---|---|
| 1,438,359 | 12/1922 | Caron | 280/11 |
| 1,477,513 | 12/1923 | McNeill | 280/8 |
| 1,639,035 | 8/1927 | Hall | 280/11 |
| 1,716,611 | 6/1929 | Wilson | 280/47.27 X |
| 1,927,710 | 9/1933 | Lindsay | 280/8 |
| 2,177,588 | 10/1939 | Genell | 280/8 |
| 2,185,509 | 1/1940 | Lambert | 280/9 |
| 2,415,655 | 2/1947 | Reinert | 280/47.13 R X |
| 2,467,644 | 4/1949 | Wright et al. | 280/5.24 |
| 2,624,588 | 1/1953 | Jones | 280/9 |
| 2,969,244 | 1/1961 | Duncan | 280/8 |
| 3,046,035 | 7/1962 | Nichols | 280/47.27 |
| 3,698,736 | 10/1972 | Shape | 280/47.18 X |
| 3,730,542 | 5/1973 | Chadwick | 280/9 |
| 3,779,568 | 12/1973 | Wakabayashi | 280/9 |
| 4,040,638 | 8/1977 | Flagg | 280/9 |
| 4,046,391 | 9/1977 | Restad et al. | 280/5.24 |

FOREIGN PATENT DOCUMENTS 1148701  5/1963  Fed. Rep. of Germany ......... 280/9

*Primary Examiner*—Joseph F. Peters, Jr.
*Assistant Examiner*—Milton L. Smith
*Attorney, Agent, or Firm*—Jack E. Ebel; Stephen A. Gratton

[57] ABSTRACT

An assemblage for hand trucks which provides for interchangeable runners and wheels, as desired, to move the hand truck over a particular surface. The assemblage has a support frame which may be releasably secured to the frame of a hand truck and a supporting means which is releasably secured to the support frame to permit movement with respect thereto. The supporting means may be manipulated to rotate runners or wheels into contact with a surface while simultaneously rotating the wheels or runners out of contact with the surface. The support means may be releasably locked in position with respect to the support frame to ensure contact of the wheels or runners with the surface over which the hand truck is moved.

29 Claims, 9 Drawing Figures

INTERCHANGEABLE RUNNERS AND WHEELS ASSEMBLAGE FOR HAND TRUCKS

BACKGROUND OF THE INVENTION

This invention relates to a hand truck, and more particularly, to a hand truck equipped with an interchangeable runner and wheel assemblage.

Conventional hand trucks, such as disclosed in U.S. Pat. Nos. 1,639,035 to Hall; 1,716,611 to Wilson; 1,927,710 to Lindsay; 2,467,644 to Wright, et al; and 4,046,391 to Restad et al, are provided with wheels to permit the truck to be pushed or pulled. While these conventional hand trucks perform satisfactorily on surfaces, such as cement or asphalt, maneuvering wheeled hand trucks across surfaces, such as snow or ice, often proves a difficult task. When wheeling a hand truck through snow, especially fresh powder, the hand truck often becomes stuck thereby increasing the risk of injury to the load and/or operator in attempting to rectify the problem.

Several prior art carriers have been equipped with runners to facilitate movement of the device over snow and ice. U.S. Pat. Nos. 1,438,359 to Caron and 3,730,542 to Chadwick disclose retractable sleds for wheeled vehicles, such as a trailer. U.S. Pat. No. 2,624,588 to Jones discloses a game carrier which is normally supported on a wheel secured to an axle. The carrier is further provided with a runner which can be rotated about the axle to a position above the wheel when not in use. U.S. Pat. No. 4,040,638 to Flagg relates to a refuse collecting and conveying vehicle which may be moved by means of a wheel secured to a shaft at the forward end of the vehicle. A retractable snow skid is also secured to the shaft and is normally held in retracted position by a screw and wing nut combination. Both Jones and Flagg mount the one runner and one snow skid, respectively, inboard of the carrier or vehicle frame thereby increasing the lateral instability of the carrier or vehicle when loaded. None of these prior art approaches are directly applied to a conventional hand truck nor would the deficiencies of these approaches be resolved if applied to a hand truck.

Thus, a need exists for a hand truck which is equipped with an interchangeable runners and wheels assemblage which is durable, easily and effectively interchanged, and ensures stability of the hand truck during movement.

BRIEF SUMMARY OF THE INVENTION

The present invention relates to an assemblage having interchangeable runners and wheels, and more particularly to such an assemblage for a hand truck. The assemblage has a support frame, a supporting truss and an actuating slat. The support frame has a longitudinal slot therethrough in which the actuating slat is releasably secured. The supporting truss is rotatably secured to the actuating slat and carries a pair of skis and a pair of runners on spaced apart, parallel axles. When the actuating slat is secured against movement within the longitudinal slot in the support frame, the supporting truss is secured against rotational movement by stops. When the actuating slat is released and raised within the longitudinal slot, the supporting truss can be rotated to position either the runners or wheels in an operative location. The actuating slat is then lowered to secure the slat and the supporting truss against relative movement.

BRIEF DESCRIPTION OF THE DRAWINGS

The invention will be more readily understood by reference to the accompanying drawing wherein like reference numerals indicate like elements throughout the drawing figures and in which.

DETAILED DESCRIPTION

Figure 1:
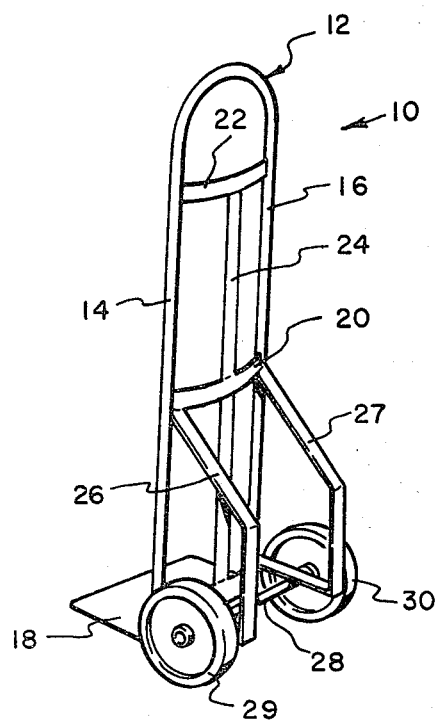
FIG. 1 is a perspective view of a conventional hand truck.

Referring to FIG. 1, a conventional hand truck is illustrated generally as 10 and has a U-shaped tubular portion 12. U-shaped portion 12 has a pair of elongated leg members 14 and 16 which are secured at one end thereof to a rectangularly configured load support 18 by any suitable means, such as welds. Elongated bands 20 and 22 are fixedly secured to leg members 14 and 16 in spaced apart fashion to increase the structural integrity thereof. Elongated band 24 is perpendicularly oriented with respect to bands 20 and 22 and fixedly secured thereto as well as to load support 18 to further increase the structural integrity of hand truck 10. A pair of generally U-shaped braces 26 and 27 are fixedly secured at the ends thereof to the lower portion of elongated leg members 14 and 16 so as to provide a support for axle 28. Axle 28 is secured to the lower, corresponding legs of braces 26 and 27, such as by welds, and has a pair of wheels 29 and 30 rotatably secured to each end thereof. As thus conventionally constructed, hand truck 10 may be wheeled over surfaces, such as cement or asphalt, without attendant difficulties. However, wheels 29 and 30 usually prove difficult to move across surfaces, such as snow and ice, and often become embedded in such surfaces to an extent such that movement thereof is not possible without risking injury to the load and/or operator.

Figure 2:
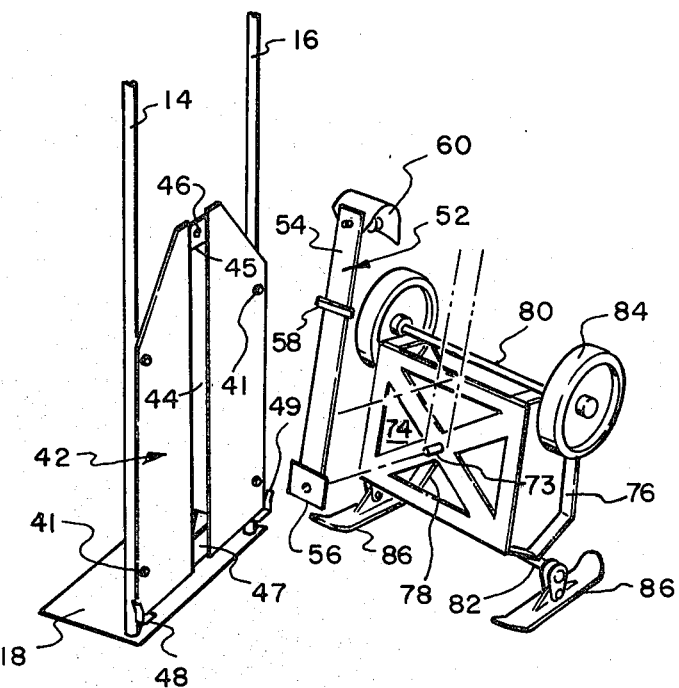
FIG. 2 is a partially exploded, perspective view of the interchangeable runners and wheels assemblage of the present invention.
Figure 4:
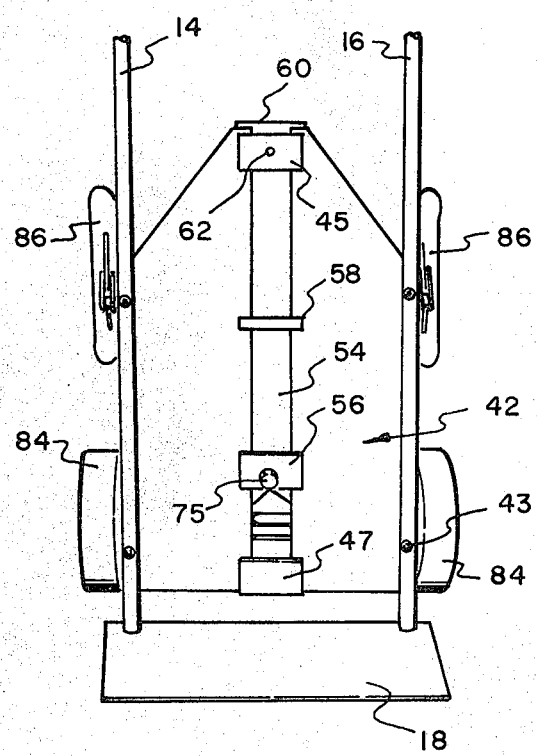
FIG. 4 is a perspective view of the assemblage of the present invention as secured to a hand truck.

Referring now to FIG. 2, the interchangeable runners and wheels assemblage of the present invention is illustrated generally as 40. Assemblage 40 has a support frame 42 and means 50 for supporting runners and wheels in a manner hereinafter described. Support frame 42 is a relatively thin sheet of material, such as aluminum, having a substantially rectangular peripheral configuration except for the corners on one end thereof which are beveled. A vertical slot 44 is positioned along the longitudinal length of frame 42 so as to divide frame 42 into two symmetrical sections. Slot 44 is bridged at one end thereof by rectangularly configured plate 45 which is sized to uniformly overlap slot 44 (as illustrated in FIG. 4). Plate 45 is fixedly secured to both sections of frame 42 by any suitable means, such as by welds. Plate 45 is provided with bore 46, for purposes hereinafter described. The other end of slot 44 is bridged by stabilizer plate 47 which is fixedly secured to frame 42 by any suitable means, such as welds, to increase the structural integrity of frame 42. A pair of generally L-shaped stops 48 and 49 are each secured to one corner of the end of frame 42 which is not beveled and project outwardly therefrom for purposes hereinafter described. The upstanding portions of L-shaped stops 48 and 49 are positioned so as to diverge from each other as the upstanding portions are extended upwardly. Thus, the upstanding portions of L-shaped stops 48 and 49 serve as guides for a portion of means 50. Frame 42 may be secured to leg members 14 and 16 of a U-shaped portion 12 of a hand truck by any suitable means, such as by welds. Preferably, however, frame 42 is secured to leg members 14 and 16 by means of a plurality of threaded bolts 41 inserted through aligned apertures in frame 42 and leg members 14 and 16 and mated with nuts 43. In this manner, the assemblage of the present invention may be retrofitted to any conventional hand truck by dismantling braces 26 and 27, axle 28 and wheels 29 and 30, providing a plurality of apertures through leg members 14 and 16 which are aligned with those of frame 42, and bolting frame 42 to the leg members of the hand truck, as aforedescribed.

Figure 5:
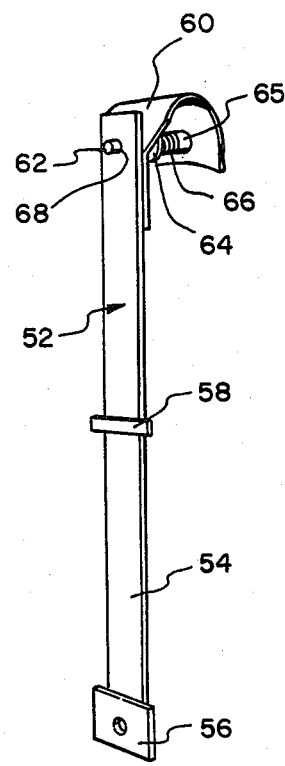
FIG. 5 is perspective view of the actuating slat of the assemblage of the present invention.

Supporting means 50 has a supporting truss 70 rotatably secured to actuating slat 52. As illustrated in more detail in FIG. 5, actuating slat 52 has an elongated member 54, a mounting member 56 fixedly secured to the one end of elongated member 54, a crossbar 58 fixedly secured to elongated member 54 intermediate the length thereof and a handle 60 fixedly secured to the other end of elongated member 54. Mounting member 56 has a generally rectangular peripheral configuration and a bore therethrough for rotatably mounting supporting truss 70, as hereinafter described. Handle 60 has a generally U-shaped cross sectional configuration and possesses a width sized to overlap elongated member 54 to provide a hand grip dimensioned so that actuating slat 52 may be effectively raised. Also the edge of handle 60 is concave to prevent slippage during manual manipulation of the handle. Handle 60 has a shaft 62 having a trigger 64 in the form of a disc attached intermediate the length thereof. One end of shaft 62 projects through a bore in handle 60 (not illustrated) and through a bore 68 in elongated member 54. The other end of shaft 62 extends within the axial bore through cylindrical member 65. Member 65 is fixedly secured to handle 60 by any suitable means, such as by welds, and serves to align and position shaft 62 with respect to bore 68. Shaft 62 is normally biased through bore 68 by means of compressed coil spring 66 which surrounds shaft 62 and acts against trigger 64 and cylindrical member 65. Shaft 62 is limited in movement through bore 68 by means of a stop secured thereto (not illustrated) which abuts handle 60. This stop is spaced apart from trigger 64 and permits shaft 62 to extend beyond actuating slat 62 a distance substantially equal to the thickness of support frame 42. The components of actuating slat 52 which are fixedly secured together may be so secured by any suitable means, such as by welds.

Figure 3:
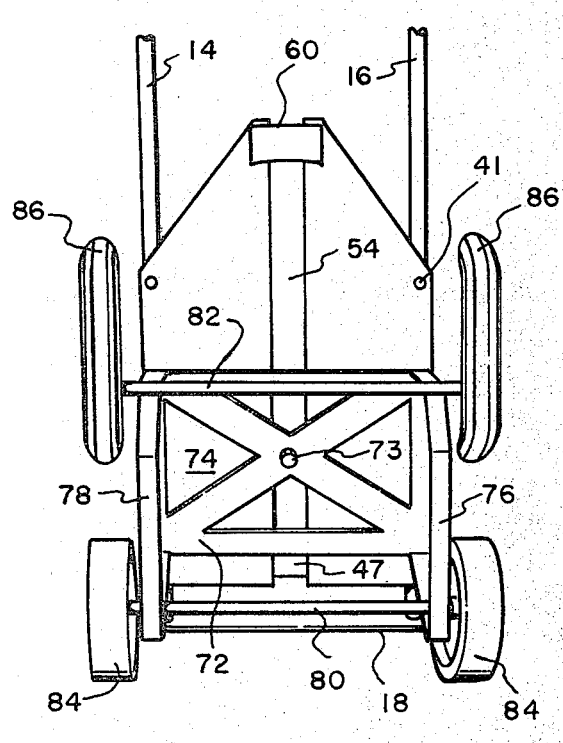
FIG. 3 is a perspective view of the assemblage of the present invention as secured to a hand truck.

Truss member 70 has a support plate 72 and braces 76 and 78. Support plate 72 has a substantially rectangular peripheral configuration and may be solid, although preferably support plate 72 is provided with a plurality of apertures 74 to reduce the total weight thereof. As illustrated, opposed apertures 74 are symmetrical and are triangular in configuration although the exact configuration of apertures 74 is not critical to the assemblage of the present invention. A substantially cylindrical axle 73 extends outwardly in a substantially perpendicular manner from approximately the center of one face of support plate 72. When assembled as illustrated in FIGS. 3 and 4, axle 73 extends through the axial bore in mounting member 56 of actuating slat 52 and is secured therein by any suitable means, such as, for example, nut 75 which may be threaded on the end of axle 73 and secured against rotation by means of a key (not illustrated). Braces 76 and 78 are substantially U-shaped and are positioned on opposite sides of support plate 72 so as to extend outwardly from the face opposite from which axle 73 extends. Braces 76 and 78 are sized to substantially extend from one edge of support plate 72 to the other edge thereof. Axles 80 and 82 are fixedly secured to opposed corresponding leg portions of braces 76 and 78. The corresponding leg portions of braces 76 and 78 to which axle 82 is secured are bent outwardly so that support plate 72 will be identically positioned with respect to the surface over which the hand truck is moved irrespective of whether skis 86 or wheels 84 are in contact therewith. In addition, axle 82 may be positioned a greater distance from plate 72 than axle 80, for example, 2 inches, to allow skis 86 to clear frame 42 during rotation of support plate 72. As such, axle 80 is substantially parallel to and spaced apart from axle 82. A pair of wheels 84 are rotatably secured to axle 80 by any suitable means, as will be evident to the skilled artisan. A pair of skis 86 are rotatably secured to axle 82, the preferred manner to rotatably secure skis 86 being hereinafter discussed.

Elongated member 54 of actuating slat 52 is slidably secured within slot 44 of support frame 42 by inserting actuating slat sideways through slot 44 until mounting member 56 and crossbar 58 are positioned therethrough. Actuating slat 52 is then rotated so that slat 52 is in a plane substantially parallel to the plane of support frame 42 and is positioned within slot 44. Then actuating slat 52 and truss member 70 are rotatably secured together by inserting axle 73 through the axle bore in mounting member 56 and mating nut 75 with the threaded end of axle 73. Actuating slat 52 is lowered by manually lowering handle 60 until L-shaped stops 48 and 49 are encountered. Support plate 72 is then manually rotated about axle 73 until the edges of support plate 72 are aligned with the upstanding portions of L-shaped stops 48 and 49 so as to permit further downward movement. Thus, supporting means 50 and truss member 70 move downwardly until the bottom edge of support frame 70 abuts the horizontally extending portions of L-shaped stops 48 and 49. In this position, shaft 62 of handle 60 is biased by spring 66 through bore 68 of elongated member 54 and bore 46 of plate 45. As so assembled, support plate 72 is secured against rotational movement by stops 48 and 49 and against linear movement by stops 48 and 49 and shaft 62. Once assembled, bands 20 and 22 may be fixedly secured to leg members 14 and 16 of the hand truck to isolate any load on load support 18 from the assemblage of the present invention.

When it is desired to utilize skis 86 in lieu of wheels 84, shaft 62 is retracted by manual manipulation of trigger 64 and handle 60 is lifted until the bottom edge of support plate 72 is positioned above the upstanding portions of stops 48 and 49. Support plate 72 is then rotated 180° until axle 82 to which skis 86 are rotatably secured is generally parallel to the surface over which the hand truck is to be moved. Handle 60 is lowered until the bottom edge of support plate 72 abuts the horizontally extending portions of stops 48 and 49, support plate 72 being guided by the diverging upstanding portions of stops 48 and 49. Shaft 60 is then biased by spring 66 through bores 68 and 46, as aforedescribed. It can thus be appreciated that the assemblage of the present invention permits wheels 84 or skis 86 to be readily rotated out of contact with the surface while skis 86 or wheels 84 are concurrently rotated into contact with the surface.

Figure 8:
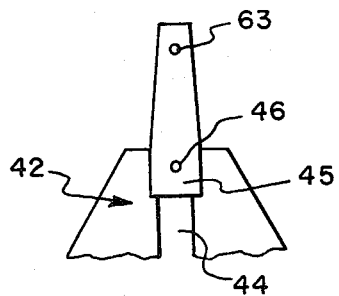
FIG. 8 is a partially cut away perspective view of one embodiment of the support frame utilized in the assemblage of the present invention.

When the load on load support 18 has a relatively unstable center of gravity, manually lifting and holding handle 60 while manually rotating support plate 72 may damage the load due to any vibrations created thereby. Thus, in many instances it may be necessary to manually stabilize the load on load support 18 while rotating the wheels and runners. In the alternative embodiment of support frame 42 illustrated in FIG. 8, plate 45 is dimensioned to extend upwardly from the top edge of frame 42 as secured to a hand truck. A second bore 53 is juxtaposed to the top edge of plate 45. As aforedescribed, plate 45 is also provided with a bore 46 herethrough. When it is desired to interchange skis 86 and wheels 84, handle 60 is released and lifted as previously described while the load on load support 18 is manually stabilized. Handle 60 is lifted until shaft 60 is biased by spring 66 into bore 63 so as to support actuating slat 52 and support truss 70. Support truss 72 is then manually rotated while the load is concurrently stabilized. Thereafter, handle 60 is lowered and secured as aforedescribed.

Figure 6:
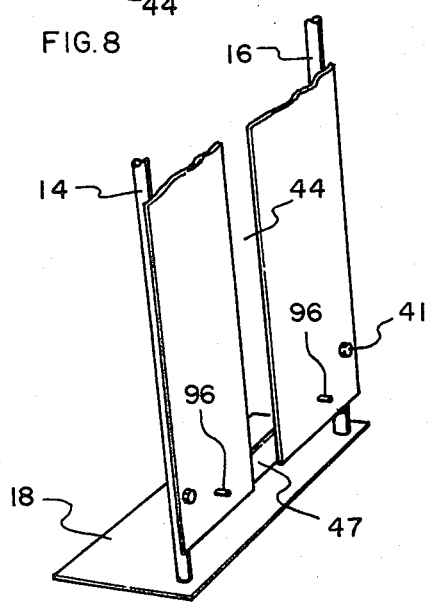
FIG. 6 is a partially exploded, partially cut away perspective view of alternative stops utilized in the assemblage of the present invention.

An alternative embodiment of the stops utilized to secure support plate 72 against rotational and linear movement is illustrated in FIG. 6. A pair of cylindrical bars 96 are juxtaposed in a substantially identical manner to the lower edge of support frame 42 and are positioned on opposite sides of slot 44. Bars 96 extend outwardly from frame 42 in a substantially perpendicular manner. Support plate 72 of truss 70 is provided with a pair of notches 98 on both edges of plate 72 which are parallel to axles 80 and 82. Notches 98 are tapered inwardly to a circular bore 100 into which rods 96 will fit in interference relation. Thus, when support frame 42 is lowered by means of handle 60, rods 96 will encounter notches 98 and will be guided by the taper of notches 98 into an interference fit with bores 100. Although a pair of rods 96 and a corresponding pair of notches 98 are illustrated, utilizing one or more notches and rods is within the scope of the present invention.

Figure 7A:
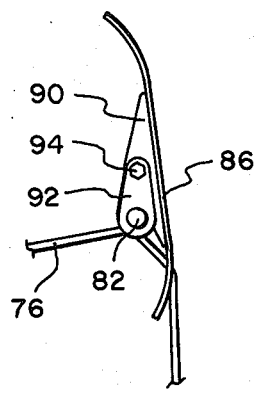
FIGS. 7a and b are partially cut away, side views depicting a ski of the assemblage of the present invention in an inoperative and an operative position, respectively.
Figure 7B:
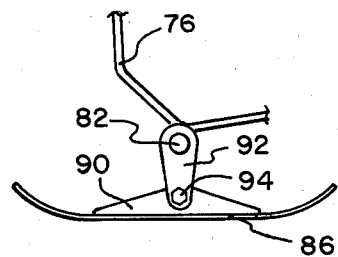

A preferred manner of rotatably mounting skis 86 to axle 82 is illustrated in FIGS. 7a and 7b. Each ski 86 is provided with an upstanding arcuate tab portion 90 which has a bore therethrough. The bore is perpendicularly positioned with respect to the axis of ski 86. A pair of elongated link members 92 are fixedly secured at one end thereof to each end of axle 82 by any suitable means, such as, by welds, and are spaced apart so as to receive tab portion 90. The other end of each elongated link member 92 is provided with a bore therethrough. Tab portion 90 is inserted between link members 92 until the bore therethrough is aligned with the bore through each of link members 92. A pin 94 is inserted through these aligned bores and held therein by any suitable means, such as, by a nut mated with a threaded portion of pin 94 (not illustrated). This preferred mounting means allows skis 86 to depend in a relatively vertical manner due to gravitational force when skis 86 are disengaged from the surface over which the hand truck is to be moved, as illustrated in FIG. 7a. As such, skis 86 are positioned so as not to obstruct the operator while maneuvering the hand truck when skis 86 are not in use. When rotated into contact with the surface, as illustrated in FIG. 7b, and releasably locked in this position, as aforedescribed, skis 86 rotate about pins 94 to accommodate movement over varying terrain. It is important to note that skis 86 are arcuate in cross section and, as such, provide for bi-directional movement. Skis 86 may also be provided with at least one strip of material (two are illustrated in FIG. 3) longitudinally orientated on the underside thereof so as to provide edges which substantially prevent lateral movement of skis 86. And although the assemblage of the present invention has been described as providing interchangeable skis and wheels for a hand truck, the assemblage of the present invention is not limited to skis but is inclusive of any type of runner, such as blades adapted especially for use on ice.

The materials selected to construct the assemblage of the present invention, as well as the dimensions of the assemblage, should be selected not only for the strength and durability thereof, but also to reduce the weight of the assemblage. And although some components of the assemblage of the present invention have been partially cut away to reduce the weight thereof while other components have not, it is to be understood that the structure of any or all of the components may be configured to reduce the weight thereof. For example, apertures may be formed in support frame 42 to reduce the weight thereof.

While various embodiments and modifications of this invention have been described in the foregoing description, further modifications will be apparent to those skilled in the art. Such modifications are included within the scope of this invention as defined by the following claims.

I claim:

1. An assemblage for use with a hand truck, the assemblage suporting a pair of wheels and a pair of runners such that the pair of runners and the pair of wheels may be interchanged to facilitate movement of the hand truck over dissimilar surfaces, the assemblage comprising:

a support frame adapted to be releasably secured to the hand truck; and means for supporting said pair of wheels and said pair of runners such that when one of said pair of wheels and said pair of runners is rotated from an operative position in contact with said surface to an inoperative position out of contact with said surface, the other of said pair of wheels and said pair of runners is concurrently rotated from said inoperative position to said operative position, said supporting means being slidably secured to said support frame.

2. The assemblage of claim 1 wherein said support means comprises:

an actuating slat having an elongated member, a handle fixedly secured to one end of said elongated member, a crossbar fixedly secured to said elongated member intermediate the length thereof, and a mounting member fixedly secured to the other end said elongated member; and a supporting truss rotatably secured to said mounting member, said supporting truss having a pair of axles fixedly secured thereto in a parallel, spaced apart fashion, one of said pair of axles having one of said pair of wheels rotatably secured to each end thereof, and the other of said pair of axles having one of said pair of runners rotatably secured to each end thereof.

3. The assemblage of claim 2 wherein said supporting truss has a generally rectangularly configured plate and a pair of substantially U-shaped braces juxtaposed to opposite edges of said support plate in a substantially parallel member, said braces fixedly secured at the ends thereof to said support plate, one of said pair of axles fixedly secured to corresponding portions of said pair of braces, the other of said pair of axles fixedly secured to opposed corresponding portions of said pair of braces.

4. The assemblage of claim 3 wherein said support plate has an axle fixedly secured thereto, said axle extending outwardly from substantially the center of one face of said support plate in a substantially perpendicular manner.

5. The assemblage of claim 4 wherein said mounting member has a bore therethrough, said axle secured to said support plate being rotatably secured within said bore.

6. The assemblage of claim 5 wherein said support frame has a longitudinal slot therethrough which divides said support frame into two symmetrical sections, said longitudinal slot being bridged by a first plate at one end of said slot, and a second plate at the other end of said slot, said first plate having a bore therethrough.

7. The assemblage of claim 6 further comprising:
   a cylindrical member fixedly secured to said handle and having an axial bore therethrough;
   a shaft having one end received within said axial bore in said cylindrical member, said shaft extending through a bore formed through said elongated member;
   a generally cylindrical disc secured to said shaft intermediate the length thereof;
   a coil spring surrounding said shaft and positioned between said disc and said cylindrical member, said coil spring acting against said cylindrical member and said disc to bias said shaft through said bore in said elongated member when said spring is unrestrained.

8. The assemblage of claim 7 wherein said elongated member is slidably secured within said longitudinal slot of said support frame, said shaft being biased through said bore formed through said first plate to secure said elongated member and said supporting truss against movement when one of said pair of wheels and said pair of runners is in an operative position.

9. The assemblage of claim 8 further comprising:
   means for securing against rotational movement of said supporting truss when one of said pair of wheels and said pair of runners is in an operative position, said securing means permitting rotational movement of said supporting truss when said disc is manipulated to compress said coil spring thereby retracting said shaft from said bore through said first plate and when said elongated member and said truss are raised by manipulation of said handle.

10. The assemblage of claim 9 wherein said securing means comprises:
    a pair of L-shaped stops secured to opposite corners of one end of said support frame.

11. The assemblage of claim 9 wherein said securing means comprises:
    a pair of generally cylindrical bars secured to different sections of said support frame and extending outwardly therefrom in a substantially perpendicular manner, said bars being substantially parallel; and
    two pairs of notches formed in opposing edges of said support plate, said bars being received within said notches in an interference relationship when one of said pair of wheels and said pair of runners is in an operative position.

12. The assemblage of claim 8 wherein said first plate extends beyond said support frame and has a second bore formed therethrough, said shaft being biased through said second bore when said elongated shaft and said supporting truss are raised by manipulation of said handle.

13. The assemblage of claim 2 wherein said pair of runners is a pair of skis which are rotatably mounted to the other of said pair of axles.

14. The assemblage of claim 13 wherein each of said pair of skis has a pair of elongated strips secured to the bottom thereof to prevent lateral movement of said hand truck when said pair of skis are in an operative position.

15. A hand truck utilized to transport loads, said hand truck having a pair of elongated leg members which are secured at one end thereof to a rectangularly configured load support, the improvement comprising:
    a support frame secured to said pair of elongated leg members of the hand truck; and
    means for supporting a pair of wheels and a pair of runners such that when one of said pair of wheels and said pair of runners is rotated from an operative position in contact with a surface over which the hand truck is to be moved to an inoperative position out of contact with said surface, the other of said pair of wheels and said pair of runners is concurrently rotated from said inoperative position into said operative position, said supporting means being slidably secured to said support frame.

16. The hand truck of claim 15 wherein said support means comprises:
    an actuating slat having an elongated member, a handle fixedly secured to one end of said elongated member, a crossbar fixedly secured to said elongated member intermediate the length thereof, and a mounting member fixedly secured to the other end of said elongated member; and
    a supporting truss rotatably secured to said mounting member, said supporting truss having a pair of axles fixedly secured thereto in a parallel, spaced apart fashion, one of said pair of axles having one of said pair of wheels rotatably secured to each end thereof, and the other of said pair of axles having one of said pair of runners rotatably secured to each end thereof.

17. The hand truck of claim 16 wherein said supporting truss has a generally rectangularly configured plate and a pair of substantially U-shaped braces juxtaposed to opposite edges of said support plate in a substantially parallel manner, said braces fixedly secured at the ends thereof to said support plate, one of said pair of axles fixedly secured to corresponding portions of said pair of braces, the other of said pair of axles fixedly secured to opposed corresponding portions of said pair of braces.

18. The hand truck of claim 17 wherein said support plate has an axle fixedly secured thereto, said axle extending outwardly from substantially the center of one face of said support plate in a substantially perpendicular manner.

19. The hand truck of claim 18 wherein said mounting member has a bore therethrough, said axle secured to said support plate being rotatably secured within said bore.

20. The hand truck of claim 19 wherein said support frame has a longitudinal slot therethrough which divides said support frame into two symmetrical sections, said longitudinal slot being bridged by a first plate at one end of said slot, and a second plate the other end of said slot, said first plate having a bore therethrough.

21. The hand truck of claim 20 further comprising:
a cylindrical member fixedly secured to said handle and having an axial bore therethrough;
a shaft having one end received within said axial bore in said cylindrical member, said shaft extending through a bore formed through said elongated member;
a generally cylindrical disc secured to said shaft intermediate the length thereof;
a coil spring surrounding said shaft and positioned between said disc and said cylindrical member, said coil spring acting against said cylindrical member and said disc to bias said shaft through said bore in said elongated member when said spring is unrestrained.

22. The hand truck of claim 21 wherein said elongated member is slidably secured within said longitudinal slot of said support frame, said shaft being biased through said bore formed through said first plate to secure said elongated member and said supporting truss against movement when one of said pair of wheels and said pair of runners is in an operative position.

23. The hand truck of claim 22 further comprising:
means for securing against rotational movement of said supporting truss when one of said pair of wheels and said pair of runners is in an operative position, said securing means permitting rotational movement of said supporting truss when said disc is manipulated to compress said coil spring thereby retracting said shaft from said bore through said first plate and when said elongated member and said truss are raised by manipulation of said handle.

24. The hand truck of claim 23 wherein said securing means comprises:
a pair of L-shaped stops secured to opposite corners of one end of said support frame.

25. The hand truck of claim 23 wherein said securing means comprises:
a pair of generally cylindrical bars secured to different sections of said support frame and extending outwardly therefrom in a substantially perpendicular manner, said bars being substantially parallel; and
two pairs of notches formed in opposing edges of said support plate, said bars being received within said notches in an interference relationship when one of said pair of wheels and said pair of runners is in an operative position.

26. The hand truck of claim 22 wherein said first plate extends beyond said support frame and has a second bore formed therethrough, said shaft being biased through said second bore when said elongated shaft and said supporting truss are raised by manipulation of said handle.

27. The hand truck of claim 16 wherein said pair of runners is a pair of skis which are rotatably mounted to the other of said pair of axles.

28. The hand truck of claim 27 wherein each of said pair of skis has a pair of elongated strips secured to the bottom thereof to prevent lateral movement of said hand truck when said pair of skis are in an operative position.

29. The hand truck of claim 15 wherein said support frame is releasably secured to said pair of elongated leg members.

* * * * *